US005735105A

United States Patent [19]

Stroud et al.

[11] Patent Number: 5,735,105

[45] Date of Patent: Apr. 7, 1998

[54] ENCAPSULATION APPARATUS AND PROCESS

[75] Inventors: Norman S. Stroud, Safety Harbor; David J. Walker, St. Petersburg, both of Fla.; Kelvin R. Garnett; Arthur J. Burnett, both of Wiltshire, England; Anthony J. Wood, Woking Surry, England

[73] Assignee: R. P. Scherer Corporation, Troy, Mich.

[21] Appl. No.: 481,411

[22] PCT Filed: Dec. 16, 1993

[86] PCT No.: PCT/GB93/02566

§ 371 Date: Oct. 2, 1995

§ 102(e) Date: Oct. 2, 1995

[87] PCT Pub. No.: WO94/13249

PCT Pub. Date: Jun. 23, 1994

[30] Foreign Application Priority Data

Dec. 16, 1992 [GB] United Kingdom .................... 9226238

[51] Int. Cl.[6] .............................. A61J 3/00; B29C 39/00; B65B 47/00

[52] U.S. Cl. ................................ 53/411; 53/141; 53/454; 53/560; 156/291; 156/298; 264/4; 264/DIG. 37; 425/804; 426/576

[58] Field of Search .............................. 426/576; 53/560, 53/141, 411, 452, 454; 264/4, DIG. 37; 425/804, 5; 206/484; 156/291, 298

[56] References Cited

U.S. PATENT DOCUMENTS

| | | | |
|---|---|---|---|
| 2,288,327 | 6/1942 | Scherer | 53/560 |
| 2,663,129 | 12/1953 | Donofrio | 53/560 |
| 4,028,024 | 6/1977 | Moreland | 425/804 |
| 5,246,635 | 9/1993 | Ratko et al. | 425/804 |

FOREIGN PATENT DOCUMENTS

| | | |
|---|---|---|
| 91-3696 | 5/1991 | Rep. of Korea . |
| 9215828 | 9/1992 | WIPO . |

OTHER PUBLICATIONS

"Soft Gelatin Capsules" by J.P. Stanley, from The Theory and Practice of Industrial Pharmacy, edited by L. Lachman, H.A. Lieberman and J.L. Kanig, published by Lea & Fabiger, 1970.

"Softgel" (Soft Gelatin Capsule) Update; by R.J. Jimerson, from Drug Development and Industrial Pharmacy, vol. 12, 1986.

Database WPI, Week 8901, Derwent Publicaitons Ltd., London, GB: AN 89-00313 & JP.A.63 280 017 (Scherer R P Corp) 17 Nov. 1988.

*Primary Examiner*—George Yeung
*Attorney, Agent, or Firm*—McDonnell Boehnen Hulbert & Berghoff

[57] ABSTRACT

A continuous solvent free gelatin encapsulation apparatus and process includes an oil roll back assembly (20) for applying a controlled amount of a food-approved lubricant to a first side of the gelatin ribbon and an applicator guide bar assembly (40) for applying a controlled amount of food-approved lubricant to a second side of the gelatin ribbon. Two opposing food-approved lubricant coated gelatin ribbons are then united in a die assembly (50) to form gelatin capsules which are then dried and recovered.

22 Claims, 6 Drawing Sheets

ENCAPSULATION APPARATUS AND PROCESS

BACKGROUND OF THE INVENTION (1) Field of the Invention

This invention concerns a soft gelatin encapsulation apparatus and process.

(2) Description of the Related Prior Art

It is known to provide soft gelatin encapsulation machines in which a pair of gelatin ribbons are cast on respective casting drums and then brought together face-to-face between a pair of rotary dies where capsules are formed and filled by an injection wedge. Removal of the capsules from the remaining ribbons, known as a net, is assisted by stripper rollers.

Traditionally, "food-grade" mineral oil has been used to lubricate the cast gelatin ribbons in gelatin encapsulation machines in order to ease the transfer of the cast gelatin ribbons to the injection wedge and rotary dies. The lubricant not only prevents the adhesion of the cast ribbon to machine surfaces, but also minimizes the adhesion of the gel net to the stripper rollers and minimizes finished capsule clumping. In addition, the lubricant forms a liquid seal between the ribbons and the injection wedge, this seal being necessary to prevent air from entering the capsules as they are formed.

To facilitate capsule drying, the lubricant on the capsules had to be removed. Traditionally, an organic solvent such as petroleum naphtha was used for this purpose. The use of the lubricant and the petroleum solvent resulted in residual amounts of solvent and oil on finished capsules. It was found that the petroleum wash solvent was readily absorbed by the lubricant, and that during encapsulation the lubricant on the upper surfaces of the ribbons, which formed the inside surfaces of the finished capsules, became entrapped within the capsules.

Consumer preference for solvent-free products and the likelihood of legislation to limit or eliminate the use of mineral hydrocarbons created the need for a gelatin encapsulation process that eliminates the use of solvents. In the known processes, however, because of the importance attached to the use of lubricants to obtain trouble free encapsulation, it has been assumed that a solvent washing step to remove the lubricants is essential.

SUMMARY OF THE INVENTION

Viewed from one aspect the invention provides a solvent-free gelatin encapsulation process comprising the steps of:

a. casting a continuous first gelatin ribbon and a continuous second gelatin ribbon;

b. applying a controlled amount of a food-approved lubricant to a first side of the first gelatin ribbon and to a first side of the second gelatin ribbon;

c. applying a controlled amount of a food-approved lubricant to a second side of the first gelatin ribbon and to a second side of the second gelatin ribbon to give a lubricated first gelatin ribbon and a lubricated second gelatin ribbon;

d. uniting the lubricated first gelatin ribbon and the lubricated second gelatin ribbon to form gel pockets and injecting fill material into the gel pockets to give freshly formed gelatin capsules;

e. finishing the freshly formed gelatin capsules to give finished gelatin capsules; and f. recovering the finished gelatin capsules.

There is thus provided a solvent-free gelatin encapsulation process, i.e. a process in which the use of a solvent wash step is, surprisingly, omitted.

Viewed from another aspect the invention provides lubricant applying apparatus for use with soft gelatin encapsulation apparatus, comprising first applicator means for applying a controlled amount of a food approved lubricant to a first side of a gelatin ribbon, and second applicator means for applying a controlled amount of a food-approved lubricant to a second side of the gelatin ribbon.

The invention also provides soft gelatin encapsulation apparatus in combination with or comprising such lubricant applying apparatus.

The invention also provides a solvent-free gelatin capsule made by the process and apparatus.

The first and second applicator means may be constructed and arranged such that only small amounts of food-approved lubricants are used. There may thus be provided a lubricant addition apparatus associated with a gelatin encapsulation process that applies a minimum amount of a food-approved lubricant to both faces of a cast gelatin ribbon, in order to promote the transfer of cast gelatin ribbons, for example to rotary dies, and to inhibit gelatin capsule agglomeration.

Viewed from a further aspect the invention provides a soft gelatin encapsulation apparatus comprising:

- two opposing gelatin ribbon casting apparatuses for casting a first and second continuous ribbon of gelatin;
- an oil roll bank assembly for applying a controlled amount of a food-approved lubricant to a first side of the gelatin ribbon;
- an applicator guide bar assembly for applying a controlled amount of food-approved lubricant to a second side of the gelatin ribbon; and
- a rotary die assembly.

The food-approved lubricant is thus applied to a first side of the gelatin ribbon by an oil roll bank assembly and to a second side of the gelatin ribbon by an applicator guide bar assembly. Both lubricant applicators may apply a food-approved lubricant at a low controlled rate prior to gelatin capsule formation. Preferably, less lubricant is applied to the sides of the ribbons which are to form the outer capsule surfaces than to the sides which are to form the inner surfaces, since the latter require sufficient lubricant to form a seal as the capsules are formed.

In one preferred embodiment, the soft gelatin encapsulation apparatus comprises two opposing gelatin ribbon casting apparatuses for casting a first continuous ribbon of gelatin and a second continuous ribbon of gelatin. An oil roll bank assembly is complementary to each gelatin ribbon casting apparatus. Each oil roll bank assembly applies a controlled minimum amount of a food-approved lubricant to the first side of the first gelatin ribbon and to the first side of the second gelatin ribbon. The apparatus also includes a first applicator guide bar assembly for applying a controlled minimum amount of a food-approved lubricant to a second side of the first continuous ribbon of gelatin and a second applicator guide bar assembly to apply a controlled minimum amount of a food-approved lubricant to a second side of the second continuous ribbon of gelatin. Finally, the apparatus includes a die assembly complete with rotary dies and an injection wedge for filling and forming gelatin capsules from the lubricated first and second gelatin ribbons.

More specifically, the preferred embodiment is a soft gelatin encapsulation apparatus that comprises a first gelatin ribbon casting apparatus' for casting a first continuous ribbon of gelatin and a second gelatin ribbon casting apparatus for casting a second continuous ribbon of gelatin. The apparatus includes an oil roll bank assembly associated with each gelatin ribbon casting apparatus for applying a controlled amount of a food-approved lubricant to a first side of the first and second gelatin ribbons. Each oil roll bank assembly includes a lower roller, one or more intermediate rollers, and a first sintered roller having a perforated roller shaft enclosed by a sintered sleeve for applying a food approved lubricant to the first side of the gelatin ribbon. The apparatus also includes an applicator guide bar assembly associated with each gelatin ribbon casting apparatus. The applicator guide bar assembly includes a guide bar, which is preferably tapered from a central region where the diameter is greatest to end regions of smaller diameter. This assists in preventing the ribbon from folding over upon itself. The applicator guide bar assembly also has a second sintered roller including a sparge tube surrounded by a sintered sleeve for applying a controlled amount of a food-approved lubricant to a second side of the first and second gelatin ribbons. The apparatus includes a first lubricant pump driven by the lower roller of the oil roll bank assembly. The first lubricant pump delivers food-approved lubricant to the first sintered roller. A second lubricant pump is driven by an intermediate roller. The second lubricant pump delivers a food-approved lubricant to the second sintered roller. Finally, the apparatus includes a die assembly including; rolling wedge guide bars, rotary dies for forming the capsules, a first stripper roller, a second stripper roller, a first mangle roller, a second mangle roller, a gelatin capsule cooling means and a gelatin capsule transfer means.

In another preferred embodiment, this invention is a solvent free gelatin encapsulation process comprising the steps of casting a first and second gelatin ribbon, applying a controlled amount of a food-approved lubricant to a first side of the first gelatin ribbon and the second gelatin ribbon. Next, a controlled amount of a food-approved lubricant is applied to a second side of the first gelatin ribbon and a second gelatin ribbon. Finally, the first gelatin ribbon and the second gelatin ribbon are formed into gelatin capsules.

In yet another preferred embodiment, this invention is a freshly formed unfinished filled gelatin capsule prepared by the method or apparatus of this invention, the surface of which is coated with less than about 600 micrograms/gram of a food-approved lubricant.

In a preferred apparatus and process, the freshly formed gelatin capsules are cooled, in order to help prevent them clumping together or sticking to machine surfaces. This is preferably achieved by supplying cooling air or other suitable gaseous coolant (for example nitrogen, argon or carbon dioxide) to the region downstream of the dies where the capsules are formed. This may be achieved in various ways. For example, a flow of chilled air or other gaseous coolant may be generated remote from the region to be cooled and guided thereto by one or more conduits. Alternatively, chilled air or other gaseous coolant may be generated adjacent to the region. It may also be desired to cool other parts of the apparatus, such as the insides of the casting drums and/or the outsides of the drums, where the ribbons are cast. Whilst individual cooling units may be provided for each region to be cooled, or pairs or groups of regions, it is preferred to provide a central source of chilled air or other gaseous coolant which is distributed as desired.

BRIEF DESCRIPTION OF THE DRAWINGS

A preferred embodiment of this invention will now be described by way of example and with reference to the accompanying drawings wherein like numerals in the various drawings pertain to like elements and wherein.

DESCRIPTION OF THE PREFERRED EMBODIMENTS

The present embodiment relates to a solvent free gelatin encapsulation apparatus that includes a cast gelatin ribbon lubrication means that minimizes the amount of food-approved lubricant that is applied to each side of the cast gelatin ribbon prior to capsule formation thereby eliminating the need for a gelatin capsule solvent wash step. This embodiment also relates to a process for producing filled gelatin capsules, and filled gelatin capsules made by the process.

The solvent-free soft-gelatin capsule manufacturing process and apparatus is useful for applying a low level of food-approved lubricant to both faces of a gelatin ribbon using novel lubricant applicators. The amount of lubricant applied to the ribbon is controlled using lubricant pumps associated with two novel lubricant delivery assemblies. Soft gel capsules manufactured using the apparatus and process contain sufficiently low levels of food-approved lubricant that capsule solvent washing is unnecessary.

The gelatin encapsulation process is performed in three general steps using the apparatus. First, two gelatin ribbons are prepared, automatically lubricated, and continuously fed along with a liquid or paste medicament into the encapsulating portion of the apparatus. Next, the capsules are simultaneously and continuously formed and filled (the force of the injection of the medicament between the two gelatin ribbons causes the gelatin to expand into the die pockets to form the shape of the capsule), hermetically sealed, and automatically "cut out" between two rotary dies to produce filled gelatin capsules and a gelatin net from the excess unused gelatin ribbon. Finally, the resulting filled gelatin capsules are automatically conveyed to a drying unit. The process omits the finished capsule solvent wash step. Instead, the gelatin ribbons are so lightly coated with a food-approved lubricant that finished capsule solvent washing is unnecessary.

Figure 1:
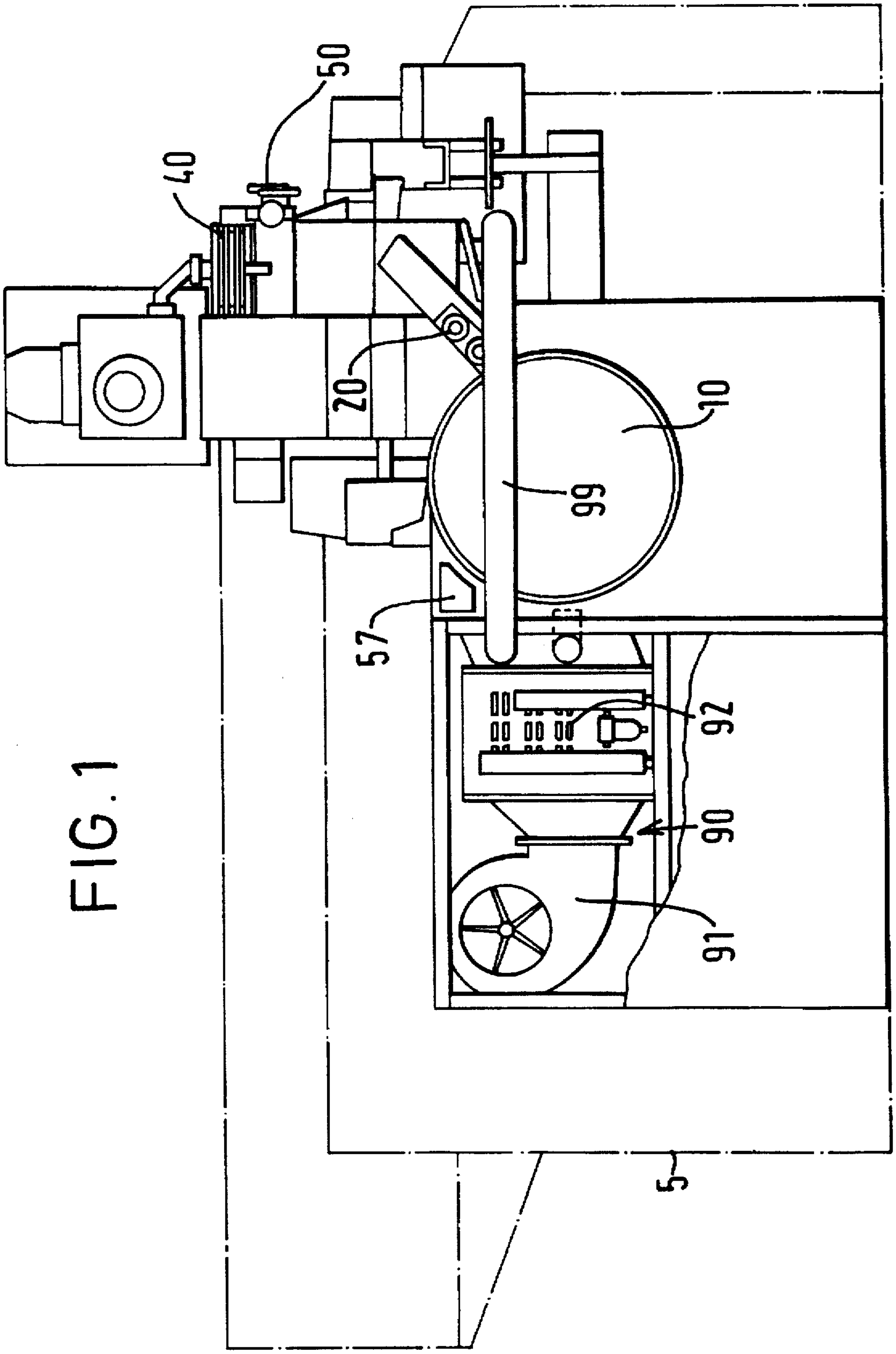
FIGS. 1 and 2 are side and front views respectively of a gelatin encapsulation apparatus of this invention.
Figure 2:
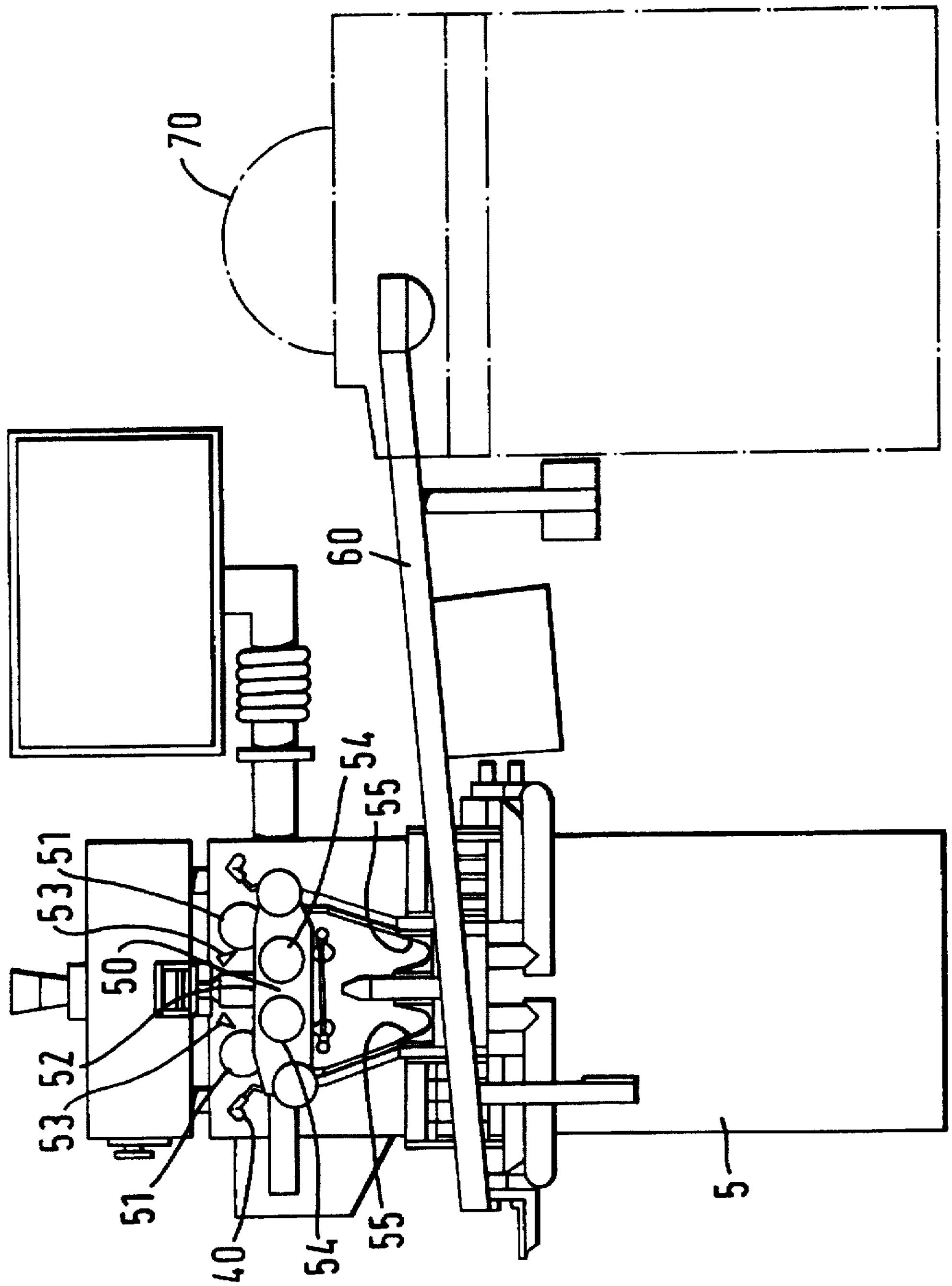

FIGS. 1 and 2 are side and front views of a solvent free gelatin encapsulation apparatus. The apparatus includes a housing 5 including a cooling system 90, a casting drum 10, an oil roll bank assembly 20, an applicator guide bar assembly 40, a die assembly 50, a capsule conveyer 60, and a capsule dryer 70. A spreader box 57 is provided to feed gel on to the casting drum 10.

Although not shown, it should be appreciated that the solvent free gelatin apparatus includes two continuous gelatin ribbon casting lines located on either side of die assembly 50. Two continuous gelatin casting lines are required because the gelatin capsules are formed in die assembly 50 from the two gelatin ribbons. Die assembly 50 unites, forms, and fills pockets in the two opposing continuous cast ribbons using an injection wedge 52 and rotary dies 54.

Die assembly 50 includes transfer rollers 51 for directing the two gelatin ribbons to injection wedge 52. Medicaments, vitamins or any other material that is being encapsulated is contacted with the gelatin ribbons at injection wedge 52 at which point the combination is formed into filled gelatin capsules by rotary dies 54. Removal of the capsules from the remaining gelatin net 80 is assisted by a pair of stripper rollers 56 (see FIG. 9). The filled gelatin capsules fall down into a pair of chutes 55 from where they are conveyed by capsule conveyor 60 to capsule dryer 70.

An important aspect of the preferred apparatus and process is the lubrication of both sides of each cast gelatin ribbon prior to capsule formation. The first side of a gelatin ribbon is lubricated using oil roll bank assembly 20, the second side is lubricated using applicator guide bar assembly 40.

Figure 3:
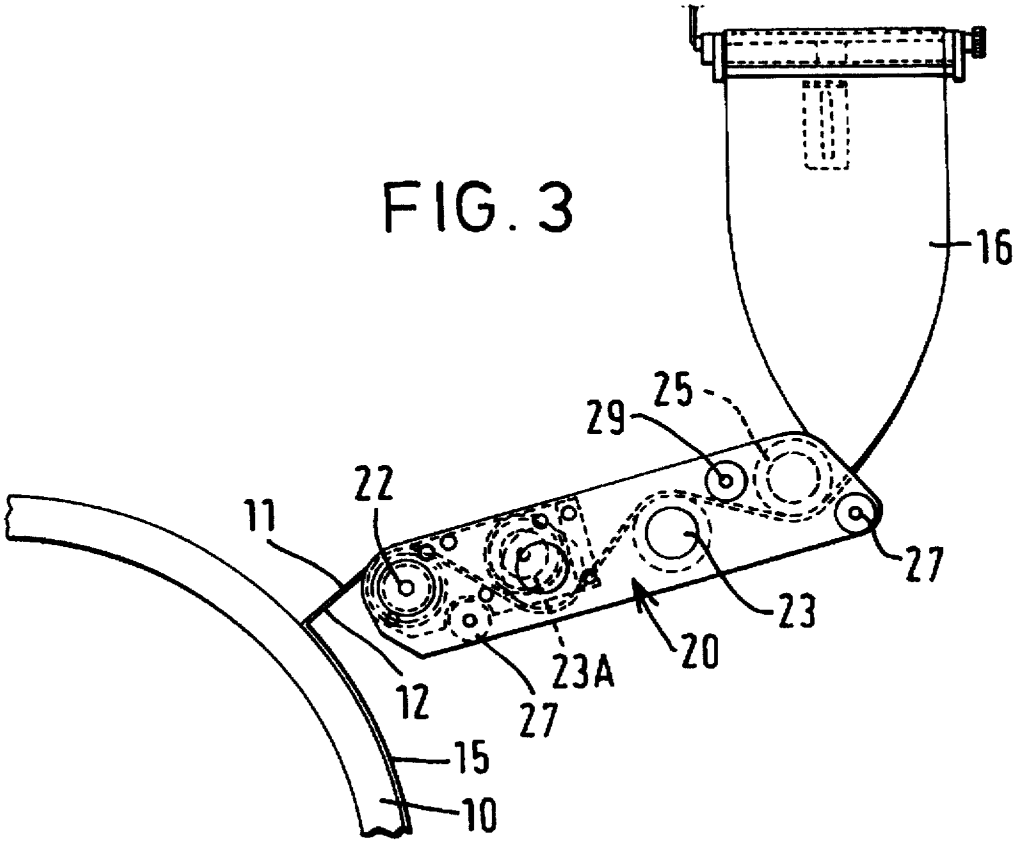
FIG. 3 is a side view of portions of the gelatin encapsulation apparatus of this invention.

FIG. 3 is a side view of one of the lubricant systems of the gelatin encapsulation apparatus of this invention. A gelatin ribbon 15 having a first side 11 and a second side 12 is continuously cast by casting drum 10. Gelatin ribbon 15 is formed from a liquid gel mass held in a heated tank or hopper. The gel mass from the tank is directed through the spreader box 57 and the spreader box temperature is monitored and controlled to ensure gelatin ribbon uniformity. Preferably the spreader box temperature ranges from 40°–70° C. The spreader box directs the liquid gel mass to casting drum 10. The cast gelatin ribbon 15 is then directed across various rollers associated with oil roll bank assembly 20 and emerges with a lubricated first side 11.

The partially lubricated gelatin ribbon 16 is then twisted through 90° and directed to applicator guide bar assembly 40. Partially lubricated gelatin ribbon 16 passes through applicator guide bar assembly 40 where second side 12 of partially lubricated gelatin ribbon 16 is lubricated to define a lubricated gelatin ribbon.

Figure 4:
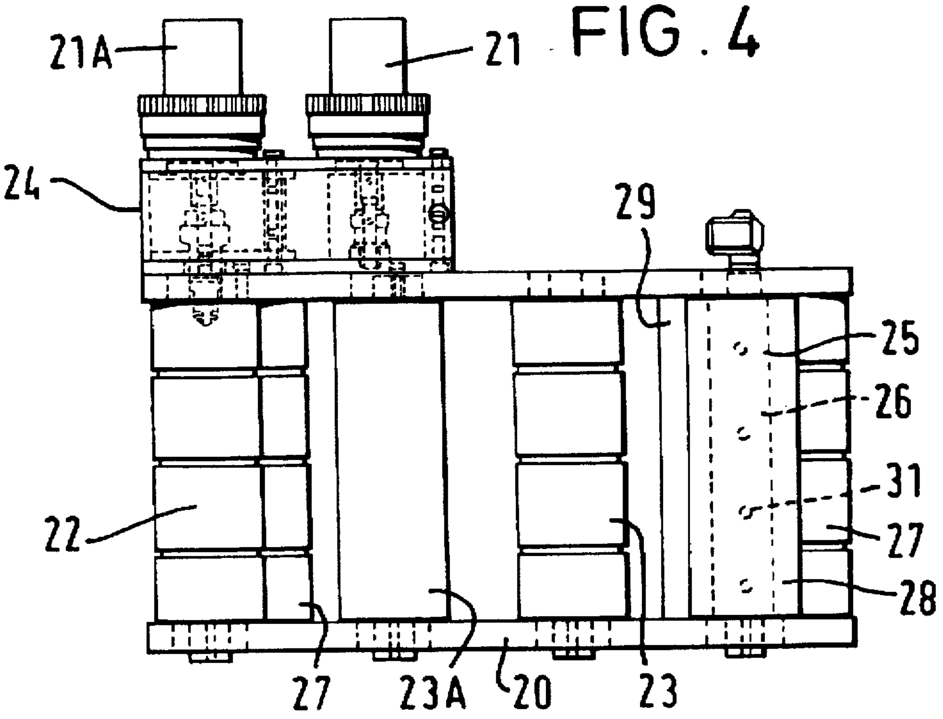
FIG. 4 is a top view of the oil roll bank assembly of the gelatin encapsulation apparatus of this invention.

FIG. 4 is a top view of the oil roll bank assembly 20 of this invention. Oil roll bank assembly 20 includes a lubricant pump assembly 24 associated with lower roller 22 and intermediate roller 23A. Lubricant pump assembly 24 includes a lubricant pump 21 associated with oil roll bank assembly 20 and lubricant pump 21A associated with applicator guide bar assembly 40. The rotation of lower roller 22 and intermediate roller 23A drive the pumps associated with lubricant pump assembly 24. The outlet of pump 21 is connected by a tube to first sintered roller 25 of oil roll bank assembly 20. First sintered roller 25 includes a perforated roller shaft 26 surrounded by sintered sleeve 28. The outlet of pump 21A is connected by a tube to second sintered roller 44 of applicator guide bar assembly 40.

It is not critical what roller operates lubricant pumps 21 and 21A. It is also not critical which lubricant pump supplies food-approved lubricant to first sintered roller 25 or second sintered roller 44. What is important is that lubricant pumps 21 and 21A are operated by rollers. This way the food-approved lubricant flow rate changes automatically as a result of an increase or decrease in gelatin ribbon speed. Additionally, it is preferred that the stroke of lubricant pumps 21 and 21A is adjustable to allow for fine tuning of the food-approved lubricant flow rate.

Referring to FIGS. 3 and 4, gelatin ribbon 15 is directed to oil roll bank assembly 20 where its second side 12 contacts lower roller 22. Next, gelatin ribbon 15 is directed under intermediate roller 23A and over intermediate roller 23. At this point, frame support 29 helps direct gelatin ribbon 15 across sintered roller 25 which applies a thin film of a food-approved lubricant to first side 11 of gelatin ribbon 15. Gelatin ribbon 15 then exits oil roll bank assembly 20. Oil roll bank assembly 20 also includes a number of ribbon spring guide rollers 27. Ribbon spring guide rollers 27 insure that gelatin ribbon 15 is aligned properly and travels smoothly into and out of oil roll bank assembly 20.

Sintered roller 25 includes a perforated roller shaft 26 surrounded by a sintered sleeve 28. Perforated roller shaft 26 is hollow and includes lubrication holes 31. Sintered sleeve 28 may be made of any porous material that will allow lubricant to be pumped through perforated roller shaft 26 through lubrication holes 31, into sintered sleeve 28, and into contact with gelatin ribbon 15. It is preferred that sintered sleeve 28 is a sintered high density polyethylene sleeve having a porosity of from 40–100 micrometers. The preferred porosity of the sinter is approximately 50 μm. With the exception of sintered rollers 25 and 44, the transfer rollers are fabricated from an inert polymer such as polytetrafluoroethylene (PTFE).

A food approved lubricant is supplied to sintered roller 25 by lubricant pump 21. The suction side of lubricant pump 21 is immersed in a food-approved lubricant located in an appropriate reservoir while the discharge is connected by a plastic or metal tube to sintered roller 25. Rotation of lower roller 22 drives lubricant pump 21. The flow rate of lubricant supplied by lubricant pump 21 or 21A can be controlled by the speed of the rotation of the drive shaft or by adjusting the pump stroke.

Figure 5:
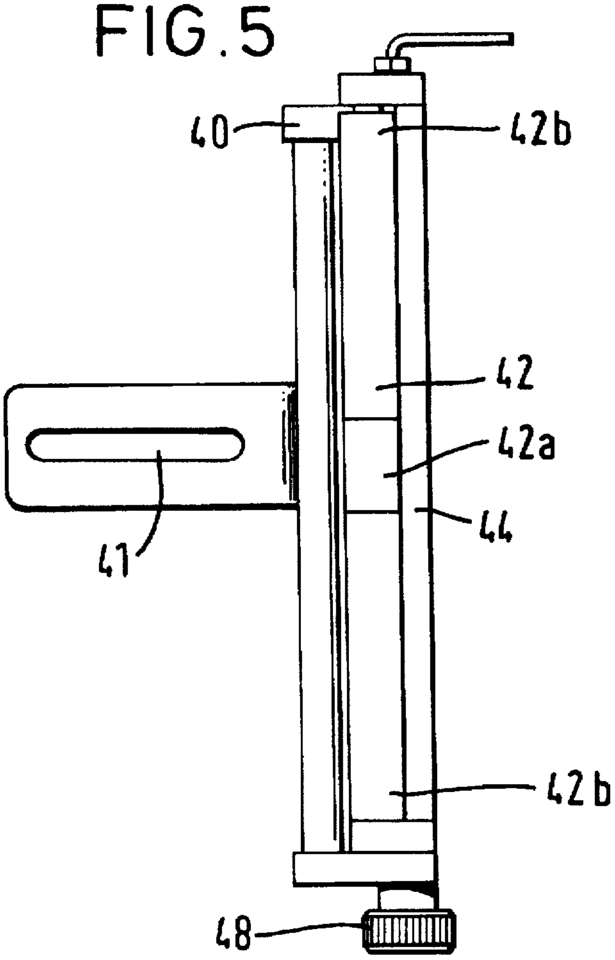
FIG. 5 is a top view of an applicator guide bar assembly of the gelatin encapsulation process of this invention.
Figure 6:
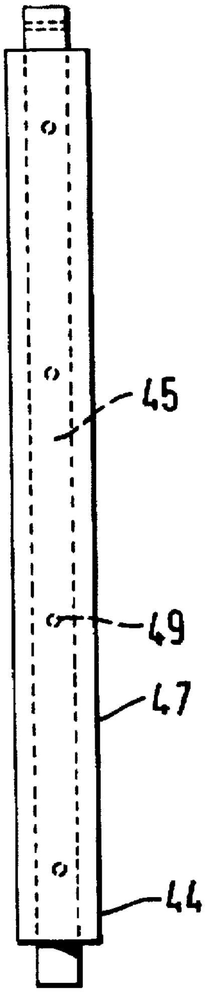
FIG. 6 is a sintered roller associated with an applicator guide bar assembly of this invention including a sintered sleeve covered perforated sparge tube.
Figure 7:
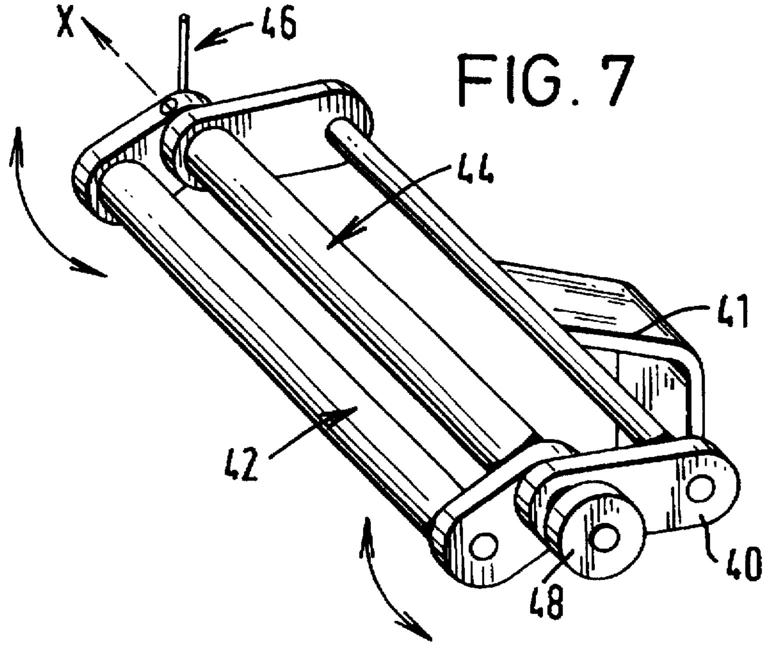
FIG. 7 is an isometric view of an applicator guide bar assembly of this invention.

The partially lubricated gelatin ribbon 16 is now directed to applicator guide bar assembly 40 where the same or different food-approved lubricant is applied to second side 12 of partially lubricated gelatin ribbon 16. FIGS. 5–7 depict various aspects of applicator guide bar assembly 40. Applicator guide bar assembly 40 includes stationary bar 42, sintered roller 44 and distribution tube 46. Second side 12 of partially lubricated gelatin ribbon 16 is lubricated by directing it under stationary bar 42 and over sintered roller 44. Sintered roller 44 includes a perforated sparge tube 45 and sintered sleeve 47. Lubricant is drawn from a reservoir by pump 21A of lubricant pump assembly 24 and pumped to distribution tube 46. A food-approved lubricant is pumped through distribution tube 46 and into perforated sparge tube 45. Perforated sparge tube 45 is covered by sintered sleeve 47. Lubricant passes through perforations 49 in perforated sparge tube 45 and into sintered sleeve 47. Second side 12 of partially lubricated gelatin ribbon 16 becomes lightly lubricated when it passes over lubricated sintered roller 44.

The stationary bar 42 has a central region **42*a* where its diameter is greatest and tapers to narrower diameter end regions 42*b*, to help prevent the ribbon from folding over on itself. The taper may for example be at 0.5° to the axis of the bar. Stationary bar 42 can also be adjusted to prevent the ribbon from folding over on itself, as well as to prevent mistracking or adhering to machine surfaces. The relationship of stationary bar 42 and sintered roller 44 can be altered by pivoting stationary bar 42 about an X-axis as shown in FIG. 7. Stationary bar 42 is pivoted by loosening lock nut 48. When stationary bar 42 is in its desired position, lock nut 48 is tightened. Stationary bar 42 is adjusted to vary the tension between partially lubricated gelatin ribbon 16 and sintered roller 44. The arrangement also permits stationary bar 42 to be skewed relative to sintered roller 44, so as to be non-parallel thereto. This assists the ribbon in twisting through 90° from the oil roll bank assembly 20 to the applicator guide bar assembly. Tracking problems and ribbon flips are thus prevented in applicator guide bar assembly 40 by careful alignment of the position of stationary bar 42 relative to sintered roller 44**.

Applicator guide bar assembly 40 has been developed to enable very low amounts of lubricant to be applied to second side 12 of partially lubricated gelatin ribbon 16 using sintered roller 44. Applicator guide bar assembly 40 also includes support bracket 41. Support bracket 41 has a slot machined in it which enables it to be attached to the encapsulation machine using an appropriate fixing device.

Perforated sparge tube 45 is a metallic or rigid plastic tube with very small holes drilled into it. The preferred diameter of the holes is in the range or from 0.002" (0.05 mm) to about 0.050" (1.3 mm) or more and preferably in the range of from 0.004" (0.1 mm) to about 0.016" (0.4 mm). Lubricant is fed to sintered sleeve 47 through these holes. Preferably, a high density polyethylene (HDPE) sinter sleeve having pores ranging from about 40 to 100 micrometers encloses perforated sparge tube 45. Lubricant is pumped through perforated sparge tube 45 into sintered sleeve 47 and is then evenly distributed on the underside of the gelatin ribbon. Sintered roller 44 rotates as the ribbon passes over it. A small bore distribution tube 46 connects the pump to perforated sparge tube 45.

The lightly lubricated ribbon travels to transfer roller 51. Transfer roller 51 can be fabricated from a hard inert plastic such as PTFE or Delrin. Transfer roller 51 minimizes ribbon drag and ribbon adhesion between applicator guide bar assembly 40 and wedge guide roller 53. The lubricated ribbon finally travels to a wedge guide roller 53. Wedge guide roller 53 facilitates the transfer of lubricated gelatin ribbon to injection wedge 52 and rotary dies 54. Wedge guide roller 53 also ensures that gelatin capsules are formed and hermetically sealed between rotary dies 54. After fabrication, the gelatin capsules are cooled, dried and collected.

The freshly formed unfinished or "green" capsules are cooled in capsule chutes 55, or on mini-conveyors, with cooled air or other gaseous coolant. Stripper rollers 56 efficiently remove any incompletely cut capsules from the net. Finally, the capsules are transferred via a linear capsule conveyor 60 into capsule tumble drier 70 to produce finished gelatin capsules.

Figure 8:
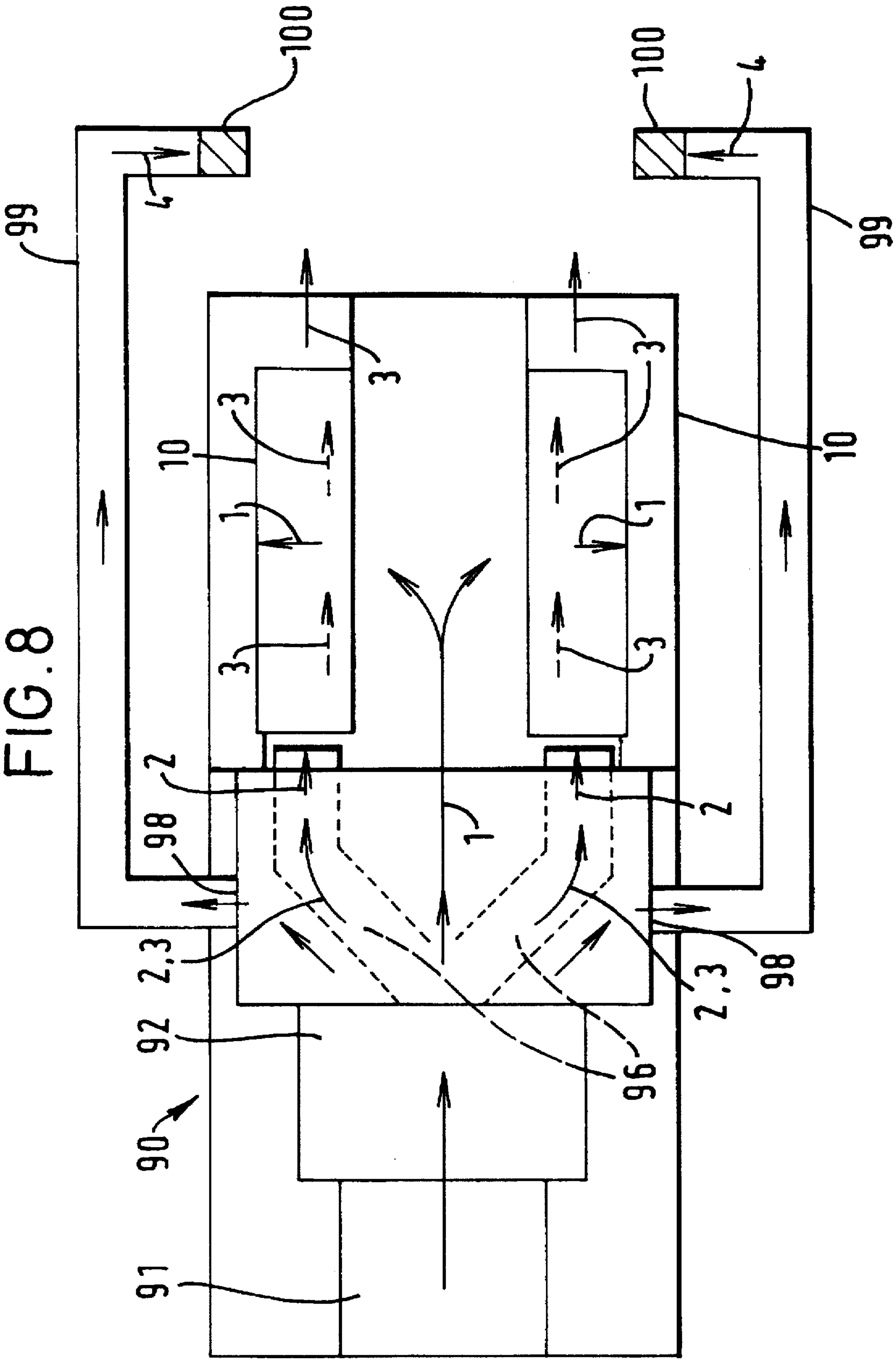
FIG. 8 is a schematic plan view showing the cooling air flow system of the apparatus.
Figure 9:
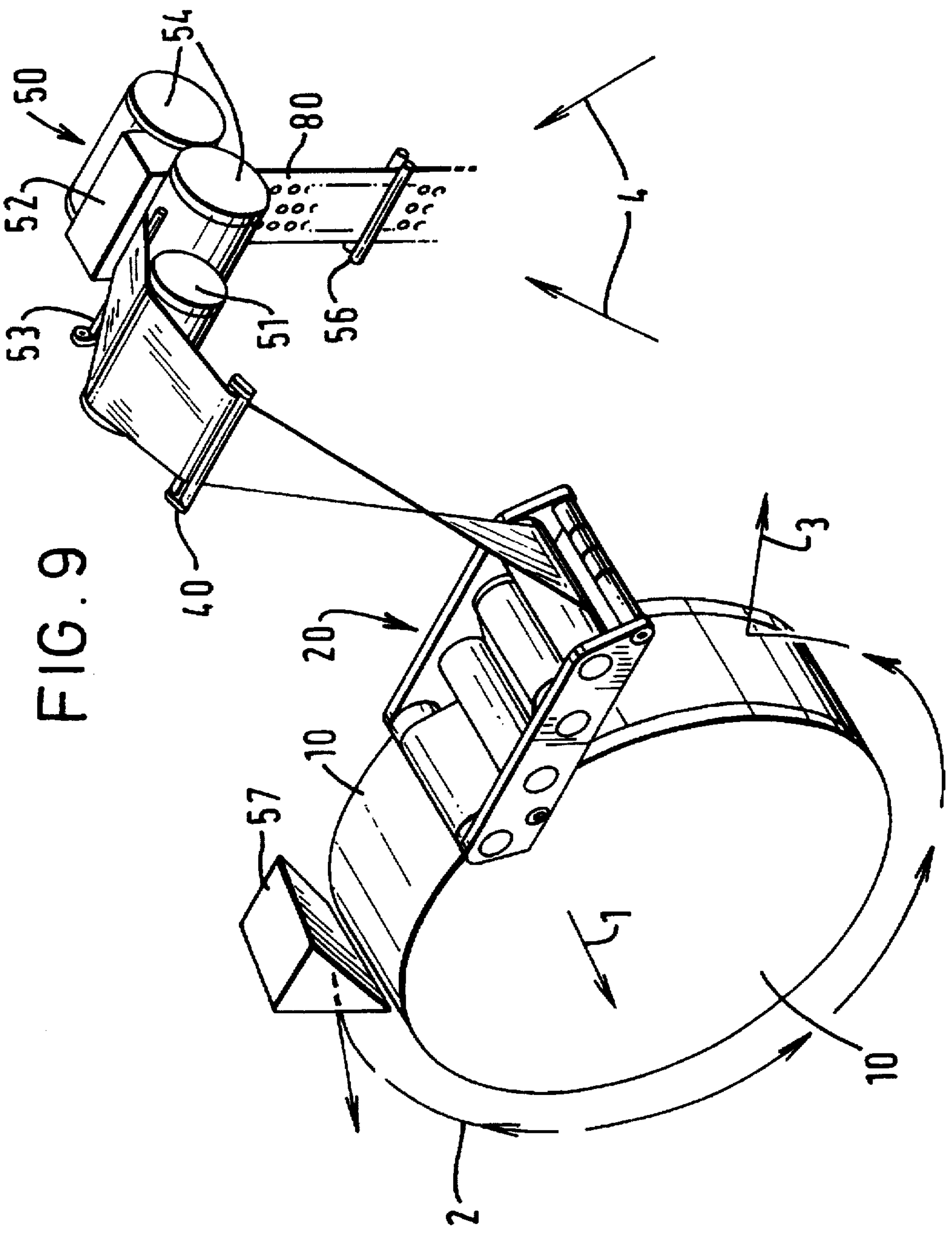
FIG. 9 is an isometric view of part of the apparatus, showing where cooling air or other gaseous coolant is distributed to certain regions.

The cooling system 90 will be described with reference to FIGS. 1, 8 and 9. A fan 91 is provided to direct air across cooling coils 92 to provide cooling air volumes 1, 2, 3 and 4. Air volume 1 passes forwardly into left and right volumes which pass laterally into the respective casting drums 10. Thus, the casting drum is cooled to cool the inner surfaces of the gel ribbons and assist their casting.

Cooling air volume 2 passes left and right via a pair of passages 96 and is directed upwardly towards the spreader boxes 57.

Cooling air volume 3 also passes left and right via the passages 96 which, as well as directing the air upwardly towards the spreader boxes 57, also direct some of the air downwardly to follow a path round and underneath the casting drums towards the front of the machine.

Cooling air volume 4 passes left and right via lateral exits 98 into passages 99 which carry the air forwardly to upwardly directed outlets 100. From there the cooling air is directed into the region below the rotary dies to cool the freshly formed capsules and the remaining gelatin net 80. This greatly assists separation of the capsules from the net and tends to prevent the capsules from sticking together and to machine surfaces such as the chutes 55 and the conveyor 60. This is particularly desirable in a low lubricant environment where the capsules tend to be rather sticky if they are not cooled. The air temperature in the region of the chutes 55 is in the range of 10°–20° C., preferably about 13°–18° C., most preferably 14°–16° C.

It is preferred that the finished gelatin capsules of this invention are coated with less than about 400 micrograms/g of residual food-approved lubricant. It is most preferred that the finished gelatin capsules are coated with less than about 300 micrograms/g or less of a food-approval lubricant. This corresponds to freshly formed or "green" gelatin capsule having a coating of about 600 micrograms/g or less of food approved lubricant.

Any food-approved lubricant may be used in conjunction with the apparatus and process of this invention. One preferred lubricant is a medium chain triglyceride such as fractionated coconut oil (FCO).

EXAMPLE 1

A prototype oil roll bank assembly and applicator guide bar assembly was fabricated and installed on an R. P. Scherer Model 14 machine. The applicator guide bar assembly sparge tube was fabricated from stainless steel with small diameter lubricant feed holes drilled at appropriate positions along its length. An outer sleeve of HDPE sinter was fabricated to fit securely but rotate freely over the sparge tube.

A double roller system comprising 1) the top roller/applicator, HDPE, and 2) a bottom, roller was installed at the guide bar positions. The ribbon was adjusted to pass between the two rollers, under the bottom roller and over the top roller. A food-approved lubricant, FCO, was then applied sparingly (typically 100–150 mg min 1) to the underside of the ribbon. Sufficient lubricant was applied to overcome gel net adhesion problems, but the lubricant residues on the capsules were consistently low enough to eliminate the need for solvent washing.

Once the system had been installed on the machine and the rollers aligned correctly it was found that this approach could be used successfully for trouble-free encapsulation. Experimental trials (using the Model System, 14 Oblong capsules, 2AZO gel mass formulation) of 7–8 hours duration were undertaken, and during the trials, samples were removed for analysis of residual lubricant. The results obtained are shown in Table I below.

TABLE I

RESIDUAL LUBRICANT

| TIME | μg/g "GREEN" CAPSULE | μg/g DRY CAPSULE |
|---|---|---|
| 1.5 hours | ND | 163 |
| 2.5 hours | 525 | 281 |
| 3.5 hours | ND | 333 |
| 4.5 hours | ND | 290 |
| 5.5 hours | 584 | 266 |
| 6.5 hours | ND | 321 |
| 7.0 hours | ND | 294 |

ND = Not determined

It is clear that by using the novel guide bar assembly, low lubricant residues can be achieved on the finished capsules.

We claim:

1. A gelatin encapsulation process comprising the steps of:

a. casting a continuous first gelatin ribbon and a continuous second gelatin ribbon;

b. applying food-approved lubricant to a first side of the first gelatin ribbon and to a first side of the second gelatin ribbon;

c. applying food approved lubricant to a second side of the first gelatin ribbon and to a second side of the second gelatin ribbon to give a lubricated first gelatin ribbon and a lubricated second gelatin ribbon;

d. uniting the lubricated first gelatin ribbon and the lubricated second gelatin ribbon to form gel pockets and injecting fill material into the gel pockets to give freshly formed gelatin capsules;

e. cooling the freshly formed gelatin capsules to assist their separation from a net formed by the remainder of the gelatin ribbons;

f. finishing the freshly formed gelatin capsules by drying them to give finished gelatin capsules; and g. recovering the finished gelatin capsules; wherein the steps of applying food-approved lubricant to the first and second gelatin ribbons comprise controlling the amount of food-approved lubricant applied to the first and second gelatin ribbons so that the finished gelatin capsules do not require a solvent wash step to remove lubricant, whereby the gelatin encapsulation process is a solvent-free process.

2. A solvent-free gelatin encapsulation process as claimed in claim 1, wherein the amount of food-approved lubricant applied to the first side and second side of the first and second gelatin ribbons is controlled with a lubricant pump.

3. A solvent-free gelatin encapsulation process as claimed in claim 1 or 2, wherein the food-approved lubricant applied to the first side of the first and second gelatin ribbons is fractionated coconut oil or a similar medium chain triglyceride.

4. A solvent-free gelatin encapsulation process as claimed in claim 1, wherein the freshly formed gelatin capsules are finished by the steps of conveying the freshly formed gelatin capsules to a dryer, and drying the freshly formed gelatin capsules to define finished gelatin capsules.

5. A solvent free gelatin encapsulation process as claimed in claim 1, wherein the amount of food-approved lubricant applied to the first and second gelatin ribbons is controlled to give freshly formed gelatin capsules coated with less than 600 micrograms/gram of a food-approved lubricant.

6. A solvent free gelatin encapsulation process as claimed in claim 1, wherein the amount of food-approved lubricant applied to the first and second gelatin ribbons is controlled so that the finished gelatin capsules are coated with less than 400 micrograms/gram of food-approved lubricant.

7. A solvent free encapsulation process as claimed in claim 1, wherein cooling air is directed onto the freshly formed gelatin capsules.

8. A solvent free encapsulation process as claimed in claim 7, wherein the air temperature in the region of the freshly formed gelatin capsules is 13–18° C.

9. A soft gelatin encapsulation apparatus comprising:

two opposing gelatin ribbon casting apparatuses for casting a first and second continuous ribbon of gelatin;

a first pair of applicator means respectively for applying a food-approved lubricant to a first side of the first gelatin ribbon and a first side of the second gelatin ribbon;

a second pair of applicator means respectively for applying a food-approved lubricant to a second side of the first gelatin ribbon and a second side of the second gelatin ribbon;

a die assembly;

cooling means for cooling the gelatin capsules when they are freshly formed by the die assembly, in order to assist separation of the gelatin capsules from a net formed by the remainder of the gelatin ribbons; and means for controlling the amount of food-approved lubricant applied to the first and second gelatin ribbons so that finished gelatin capsules do not require a solvent wash step to remove lubricant.

10. Apparatus as claimed in claim 9 wherein each applicator means of said first pair thereof comprises an oil roll bank assembly including a lower roller, one or more intermediate rollers, and a first sintered roller for applying a food-approved lubricant to the first side of the gelatin ribbon.

11. Apparatus as claimed in claim 10, wherein the first sintered roller includes a perforated roller shaft surrounded by a sintered sleeve.

12. Apparatus as claimed in claim 10 or 11, wherein the rate of food-approved lubricant delivered to the first sintered roller is controlled with a first lubricant pump.

13. Apparatus as claimed in claim 12, wherein the first lubricant pump rate is controlled by the rotation of a roller associated with the oil roll bank assembly.

14. Apparatus as claimed in claim 13, wherein each applicator means of said second pair thereof comprises an applicator guide bar assembly.

15. Apparatus as claimed in claim 14, wherein the applicator guide bar assembly includes a stationary bar and a second sintered roller for applying food-approved lubricant to the second side of the gelatin ribbon.

16. Apparatus as claimed in claim 15, wherein the stationary bar is tapered.

17. Apparatus as claimed in claim 16, wherein the second sintered roller includes a perforated sparge tube and a sintered sleeve.

18. Apparatus as claimed in claim 17, wherein the sintered sleeve is a sintered high-density polyethylene sleeve.

19. Apparatus as claimed in claim 15, wherein the rate of food-approved lubricant delivered to the second sintered roller is controlled by a second lubricant pump.

20. Apparatus as claimed in claim 19 wherein the pump rate of the second lubricant pump is controlled by the rotation of a roller associated with the oil roll bank assembly.

21. Apparatus as claimed in claim 9, wherein the cooling means is arranged to direct cooling air or other gaseous coolant onto the freshly formed gelatin capsules.

22. Soft gelatin encapsulation apparatus comprising:

lubricant applying apparatus, said lubricant applying apparatus compromising first applicator means for applying a food-approved lubricant to a first side of a gelatin ribbon, second applicator means for applying a food-approved lubricant to a second side of the gelatin ribbon, and means for controlling the amount of food-approved lubricant applied to the gelatin ribbon so that finished gelatin capsules do not require a solvent wash step to remove lubricant;

a die assembly for forming gelatin capsules using the gelatin ribbon; and cooling means for cooling freshly formed gelatin capsules to assist their separation from the remainder of the gelatin ribbon.

* * * * *